United States Patent [19]

Klausner et al.

[11] 3,991,153
[45] Nov. 9, 1976

[54] SINGLE PHASE EXTRUSION OF ACRYLIC POLYMER AND WATER

[75] Inventors: George K. Klausner, Stamford; Robert P. Kreahling, Fairfield; Vinod T. Sinha, Norwalk, all of Conn.

[73] Assignee: American Cyanamid Company, Stamford, Conn.

[22] Filed: June 24, 1975

[21] Appl. No.: 589,964

[52] U.S. Cl. .................................... 264/211; 259/191; 264/79; 264/176 F; 264/182; 264/206; 264/349; 425/208
[51] Int. Cl.² ........................................... D01F 1/02
[58] Field of Search ............. 264/349, 211, 53, 182, 264/176 R, 176 F, 206, 102, 79; 425/208, 378 R, 378 S; 259/191–192, 193

[56] References Cited
UNITED STATES PATENTS

| | | |
|---|---|---|
| 2,585,444 | 2/1952 | Coxe .................................. 264/182 |
| 3,082,816 | 3/1963 | Skidmore .......................... 264/102 |
| 3,121,914 | 2/1964 | Olson et al. ....................... 425/208 |
| 3,440,309 | 4/1969 | Breukink et al. ................. 264/53 |
| 3,538,203 | 11/1970 | Overcashier et al. ............. 264/53 |
| 3,821,129 | 6/1974 | Johnson ............................ 264/53 |
| 3,843,757 | 10/1974 | Ehrenfreund ..................... 264/53 |

Primary Examiner—Jeffery R. Thurlow
Attorney, Agent, or Firm—William J. van Loo

[57] ABSTRACT

There is disclosed an improvement in the continuous melt extrusion of a refractory polymer and its melt assistant by which a porous plug of the composition being extruded is formed between the compressing zone and the melting zone of the extruder so as to prevent loss of vaporized melt assistant by backward escape through the feed inlet.

4 Claims, 1 Drawing Figure

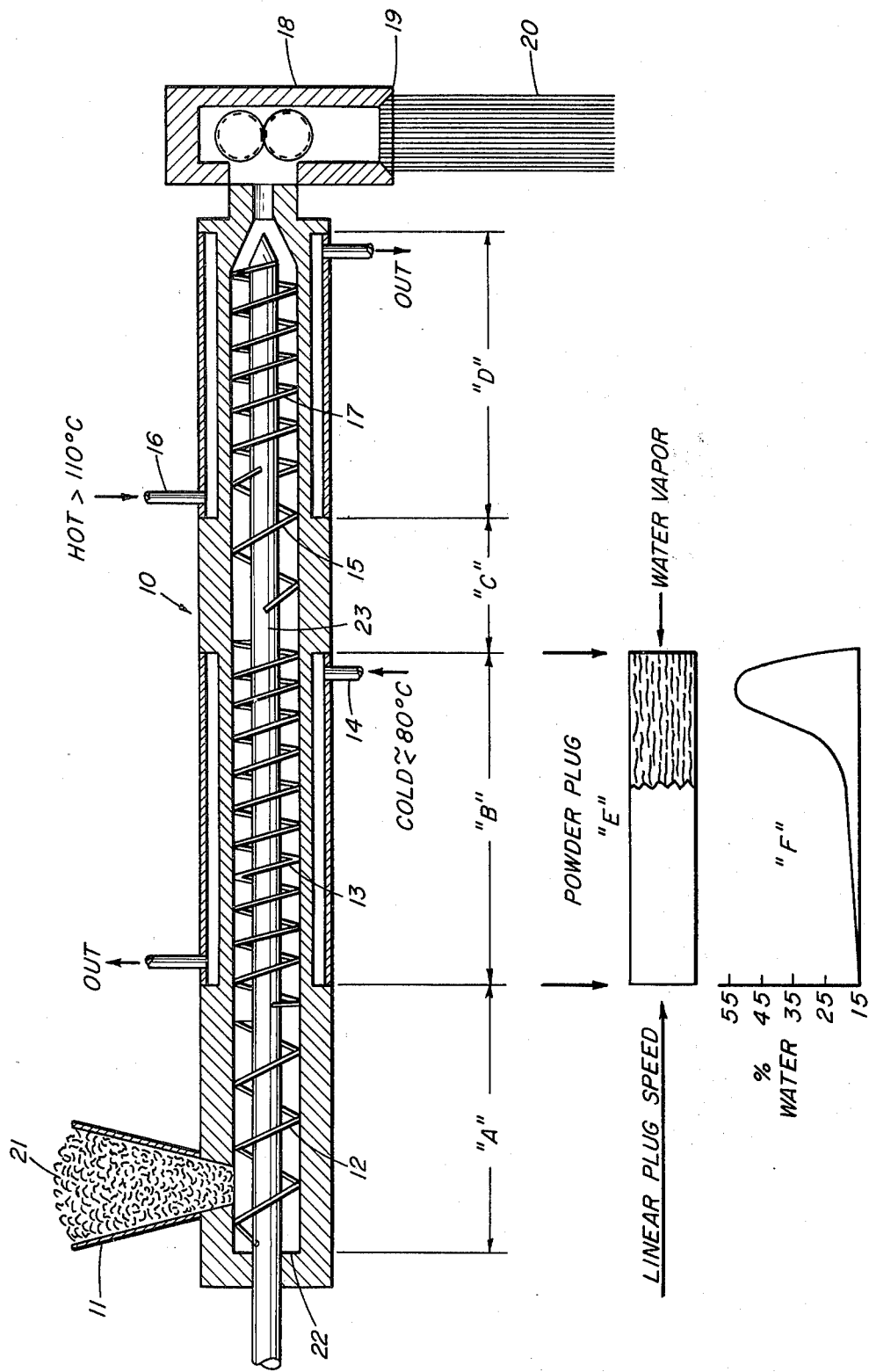

SINGLE PHASE EXTRUSION OF ACRYLIC POLYMER AND WATER

This invention relates to the melt extrusion of refractory type organic polymers in conjunction with a melt assistant. More particularly, the invention relates to conveying and melt extruding such polymers along with their melt assistants using a screw extruder. Still more particularly, the invention relates to a method for preventing escape of vapors of melt assistant which arise by volatilization in the polymer melt zone, such escape being backward through the screw extruder and out the feed inlet.

It is common practice within the plastics industry to employ screw extruders to shape useful objects from organic polymers which can be properly processed. Basically, screw extruders comprise a feed inlet, a tubular conveying section, or barrel, for conveying the polymer into various zones including a melting zone prior to forcing the melt through a shaped orifice. Within the various zones into which the polymer is conveyed, the polymer is first compressed by the action of a screw, screw pitch, and route diameter in cooporation with the barrel. Next, the polymer is usually decompressed and heated to its melting temperature or above for a sufficient time period to produce a liquid melt. The melted polymer is then metered by means of the screw or gear pumps through a shaped orifice or die and, thereafter, abruptly cooled to below melting temperature to stabilize the desired shape. High pressures are created within the extruder due to compression of the polymer and polymer melting as well as other factors. This high pressure in the melting zone tends to vent itself backward toward the lower pressures of the feed zone until it finally vents out of the feed inlet into the atmosphere. This occurrence is commonly referred to as "blowing". Such occurrences are disruptive to the extrusion operation. There is little or no tendency for the pressure to vent forward through the melt zone due to the high viscosity and density of the polymer melt as well as the restrictions imposed by the die.

If the polymer has a definite melting point well below its degradation temperature, it can be readily processed in a screw extruder. Certain polymer types, however, do not readily melt or melt at temperatures above their degradation temperatures and such polymers are referred to as refractory polymers. With refractory type polymers, the shaping operation is very difficult, if at all possible, to perform without the use of special additives.

One type of such special additive is a plasticizer. A plasticizer is a material incorporated in a plastic to increase its workability and to lower the melt viscosity. Plasticizers have low vapor pressures and, accordingly, high boiling points so that they can be used with the plastics at the melting points of plastics at atmospheric pressure in hot mill applications. A plasticizer also has solvating ability on or is solvated by the plastic with the result that at normal temperatures the combination of plasticizer and plastic is readily worked into a densified mass that prevents high pressure from venting backward through the feed inlet and eliminates disruptions of the extrusion process. Plasticizers once incorporated into a plastic remain associated therewith in the final product obtained.

For some purposes, the presence of plasticizer in the final product is unacceptable. This is particularly true in the preparation of shaped articles wherein the plasticizer detracts from the desired polymer properties. In such instances, therefore, it is not desirable to incorporate a plasticizer in the polymer being processed. Instead, use is made of melt assistants to prepare the polymer melt for extrusion. Melt assistants are not solvents for the polymer and are not compatible with the polymer under normal conditions. Melt assistants are low boiling liquids which boil at atmospheric pressure at a temperature below the melting temperature of the polymer-melt assistant composition. As a result, it is necessary to employ the melt assistant at superatmospheric pressure. At such pressure, the melt assistant is maintained in liquid form at elevated temperature whereupon the polymer-melt assistant composition fuses to provide a single phase fusion melt below the degradation temperature of the polymer but above the boiling temperature at atmospheric pressure of the melt assistant. In processing the polymer-melt assistant, therefore, it is essential that sufficient superatmospheric pressure develop and be maintained in the polymer melt zone so that the desired fusion melt can be obtained.

The problem of containing pressure within an extruder is particularly difficult in those instances where a melt assistant is required to obtain a polymer melt. The combination of melt assistant and polymer does not provide a plastic mass until the fusing and melting temperatures are reached, the mixture forming a brittle, crumbly powder with little or no resistance to pressure prior to reaching such temperatures. Vapors of melt assistant generated in the melt zone, move toward the powder prior to the melt zone because of the pressure generated in the melt zone. These vapors can move through the loose powder and escape by blowing through the feed inlet. To prevent blowing, the vapors are sometimes removed by controlled venting of the melt zone in order to reduce the internal pressure and minimize the differential with respect to the feed zone. This remedy, however, clearly lowers the concentration of melt assistant which is needed for proper melting of the polymer.

What is needed therefore, is a process for extruding a composition of polymer and melt assistant which could contain the pressure and melt assistant within the extruder and enable continuous processing to be effected without the difficulties associated with blowing and/or loss of melt assistant as encountered in the prior processes.

In accordance with the present invention, there is provided an improvement in a continuous melt extrusion process, said process comprising feeding a refractory polymer and a melt assistant into a feeding zone of a screw extruder, compressing said polymer and melt assistant in a compressing zone of said extruder, and heating said polymer and melt assistant in a melting zone of said extruder to form a single phase fusion melt of the polymer and melt assistant at a temperature above the atmospheric boiling point of said melt assistant prior to exiting from a shape-forming outlet of said extruder, the improvement comprising establishing at a zone intermediate between said compressing and said melting zones within said extruder a porous plug of compacted polymer-melt assistant at a temperature below the atmospheric boiling point of said melt assistant, said porous plug containing melt assistant condensed within the pores of said plug and advancing said plug toward the outlet of said extruder at a linear rate equal to the rate at which the melt assistant condensed within the pores of said plug moves toward said feeding zone of the extruder due to the vapor pressure generated within said melting zone.

The process of the present invention, by establishing the porous plug of polymer as indicated, contains the vapors of melt assistant and pressure generated thereby within the screw extruder and the process is continuously operative to provide the desired shaped articles. The melt assistant is contained in the resulting shaped article as a separate phase and is readily removed therefrom by evaporation or extraction to provide a shaped article of the refractory polymer substantially free of material added to effect processability of the refractory polymer through the screw extruder.

The pressure barrier comprising the porous plug of polymer containing condensed vapors of melt assistant is a dynamic barrier and is operable within the definition of the invention only when the polymer feed is equal to that of polymer extrusion and "steady-state" extruder conditions exist. The construction of the porous plug is also critical as will be more fully described hereinbelow. The porosity of the plug is such that about one-half of the total weight of the plug can be attributed to condensed melt assistant. Construction of the plug is necessarily complex and its density or porosity will depend upon the polymer particle size, angle of screw pitch, and polymer throughput rate. In addition, the backward flow of melt assistant in the plug will also be affected by the internal pressure generated and the viscosity of the melt assistant at the temperature of the plug. Although these variables will be discussed to the extent possible, a certain amount of experimental trial may be necessary to establish the necessary parameters for specific polymers and melt assistants being used therewith.

Refractory polymers useful in the process of this invention are polymers which are difficult or impossible to soften under heat without degradation or use of excessively high temperatures. The refractory polymers of principal commercial importance at the present time for forming into fibers are acrylonitrile polymers. While the principles and conditions of this invention can be used for melt extrusion of filaments from single phase fusion melts of a melt assistant and acrylonitrile polymer, other refractory polymers can be employed with suitable melt assistants, such as the various cellulose acetates, polyvinyl halides, polyvinyl alcohol, very high molecular weight polyamides, polyimides, and polyesters, and refractory polyamides, polyimides, and polyesters derived from aromatic monomers. Although the invention is not to be construed as so limited, the further description herein will be principally directed toward the commercially important acrylonitrile polymers in the interests of brevity.

A melt assistant is a material, normally liquid, which is capable when used under pressure sufficient to prevent boiling at temperatures above its atmospheric boiling point of reducing the melting point of the acrylonitrile polymer, when used in proper concentration, to a temperature preferably below the degradation range for the acrylonitrile polymer and of forming a single phase fusion melt of polymer and melt assistant. Melt assistants do not include materials which are good solvents for the acrylonitrile polymers. Certain theoretical considerations useful in selecting substances which are effective as melt assistants have been given in the prior art. Substances which meet the considerations are relatively volatile, i.e., they have boiling points at temperatures below that to which they depress the melting point of the polymers and thus, have boiling points at atmospheric pressure below the extrusion temperature of the melt. Suitable melt assistants selected in accordance with the foregoing and the theoretical considerations indicated include water, methyl alcohol, ethyl alcohol, n-propyl alcohol, isopropyl alcohol, n-butyl alcohol, iso-butyl alcohol, sec.- -butyl alcohol, t-butyl alcohol, nitromethane, nitroethane, pyridine, piperidine, morpholine, n-butylamino, iso-butylamine, sec.-butylamine, t-butylamine, acetonitrole, propionitrile, acetic acid, formic acid, acetylacetone, ethylene glycol monoethylether, 1,3-dioxane, dimethylfurane, sylvan, 1-chloro-2-hydroxyethane, propyl mercaptan, butyl mercaptan, methyl thiocyanate, diallyl sulfone, and mixtures of these compounds with each other or with known solvents or swelling agents for acrylonitrile polymers, such as dimethylformamidewater, acetonitrile-water, dimethylacetamide-water, methyl alcohol-water, methyl alcohol-dimethylformamide, phenol-water, phenol-methanol, glycol-water, glycerol-water, dilute aqueous solutions of sodium thiocyanate, zinc chloride, lithium bromide, guanidine thiocyanate, nitric acid, etc. While all the melt assistants are useful in the practice of the present invention, to produce the advantages of the steady state screw extruder operation and provide the pressure resistant plug seal which serves to confine the melt assistant vapors within the extruder chambers, water is the one melt assistant greatly preferred since it also provides the added advantages of avoiding the need for washing the product free of melt-assistant and therefore, eliminating the need for recovery systems for melt assistants.

As acrylonitrile polymers which can be used in the practice of the present invention are included those polymers or blends of polymers containing greater than about 50 weight percent combined acrylonitrile. In addition to the homopolymer of acrylonitrile, copolymers of acrylonitrile with one or more copolymerizable mono-olefinic monomers can be used. Such monomers include acrylic, alpha-chloroacrylic and methacrylic acids; the methacrylates, such as methyl methacrylate, ethyl methacrylate, butyl methacrylate, methoxymethyl methacrylate, beta-chloroethyl methacrylate, and the corresponding esters of acrylic and alpha-chloroacrylic acids; vinyl bromide, vinyl chloride, vinyl fluoride, vinylidene bromide, vinylidene chloride, allyl chloride, 1-chloro-1-bromoethylene, methacrylonitrile; acrylamide, methacrylamide, alpha-chloroacrylamide and mono-alkyl substitution products thereof; methyl vinyl ketone; vinyl carboxylates, such as vinyl formate, vinyl acetate, vinyl chloroacetate, vinyl propionate, vinyl stearate, and vinyl benzoate; N-vinylimides, such as N-vinylphthalimide and N-vinylsuccinimide; methylene malonic esters, itaconic acid, and itaconic esters; N-vinylcarbazole; vinylfuran; alkyl vinyl ethers; vinyl sulfonic acids, such as vinyl sulfonic acid, styrene sulfonic acid, methallylsulfonic acid, p-methallyloxy benzene sulfonic acid and their salts; ethylene alpha-beta-dicarboxylic acids and their anhydrides and esters, such as diethyl citraconate and diethyl mesaconate; styrene and dibromostyrene; vinylnaphthalene; vinyl-substituted tertiary heterocyclic amines, such as the vinylpyridines and alkyl-substituted vinylpyridines, e.g., 2-vinylpyridine, 4-vinylpyridine, 2-methyl-5-vinylpyridine, and the like; 1-vinylimidazole and alkyl-substituted 1-vinylimidazoles, such as 2-, 4-, and 5-methyl-1-vinylimidazoles; vinylpyrrolidone; vinylpiperidine, and other mono-olefinic copolymerizable monomers. The acrylonitrile polymers or blends of polymers generally will contain varying quantities of one or more comonomers up to about 50% based on the total polymer weight and generally will have molecular weights ranging from about 10,000 to 200,000. The quantity of comonomer and the molecular weight may vary outside these indicated ranges since the present invention does not depend upon these features for operativeness although proper consideration of the properties of the final products in their intended uses may indicate such variations.

In the discussion which follows, reference is made to the drawings, in which the sole FIGURE diagrammatically shows a preferred embodiment of the present invention with respect to a double screw type extruding device, including a cross-section of a typical porous plug and a typical profile of melt assistant content shown graphically in an embodiment where water is used as melt assistant with an acrylonitrile polymer.

In the typical practice of the wt. % invention, the powdered acrylonitrile polymer, melt assistant, and any desired optional additive are mixed together in any suitable equipment or may be fed separately to an extruder and mixed. The ratio of polymer to melt assistant typically will be in the range of about 2/1 to 20/1, depending upon the chemical composition of the polymer employed and the melt assistant used. Preferably, in the case where acrylonitrile polymers containing at least about 70 wt.% acrylonitrile are employed in conjunction with water as the melt assistant the ratio will be about 5.5/1. The resultant mixture of polymer and melt assistant remains as a powder which tends to pack on compression into a porous mass having spaces or passageways between polymer particles. At the ratio of polymer to melt assistant as defined above, some of the melt assistant is absorbed on the polymer and in the form of a surface film. When the mixture is packed as by compression at temperatures below the melting point of the polymer in the melt assistant environment, there is no softening of the polymer particles and they tend to resist deformation similar to the situation involved in attempting to compact moist sand. In the preferred practice of the invention, a mixture of the foregoing kind is fed continuously to a melt extrusion device of the type diagrammatically shown in FIG. 1. The extruder is suitably of the twin screw type, that is, there are two parallel intermeshing screws, both of which are rotated in the same direction by a common drive mechanism and the extrusion screws extend from the feed end of the extrusion barrel at the inlet forwardly to the exit end of the extruder, which is fitted with a suitable shaping device.

Referring to FIG. 1, the extruder 10 shown is provided with an inlet, or feed hopper; 11 which is in communication with an internal barrel 22 of the extruder. Screw assembly 23 is positioned within the barrel for conveying the polymer 21 from the inlet of the barrel to a metering pump 18 at the exit of the barrel. Only one screw assembly is shown although it is preferred to employ twin screws operating in side-by-side arrangement.

The extrusion screw assembly, or both when two are used, is made in distinct sections depending upon the desired function or functions to be carried out therein. In the drawing, four distinct sections A, B, C, and D are shown. In the first section of the extruder A, the screw thread 12 is relatively coarse and open so that each flight or trough of the screw accomodates a relatively large volume. In the subsequent section B, the thread 13 is somewhat finer so that a reduced volume is accomodated in each screw flight. In the third section C, the thread 15 reverts to a more open pitch and finally in the fourth section D, the thread 17 is again finer so that a reduction in volume accomodated by a flight results. The function of each pitch configuration will become clear by way of the more detailed description of the physical history of the mixture as it travels through the extruder barrel from inlet to outlet which follows. Each section can contain more than a single screw element and each element may be of different screw pitch.

It is to be noted that the extruder body in the neighborhood of section B contains internal passageways 14 through which cooling water is passed to maintain the mixture in that section of the extruder barrel at a suitably low temperature compared to the relatively high temperature of section D. In the area of section D, the extruder body is provided with suitable means for heating the mixture in the extruder barrel to the extent necessary to effect melting. The heating means may be electrical resistance windings or, alternatively, it may comprise passageways 16 provided within the extruder body for the circulation of hot fluids. A heated pump assembly 18 and heated shaping device, such as a spinnerette, 19 is attached to the outlet end of the extruder assembly. Melted polymer is passed from the extruder to the inlet of the pump and metered to the spinnerette. The liquid integrity of the polymer melt is maintained until it is forced through the orifices of the spinnerette and cooled to form a solid shaped polymeric product 20.

In operation, the mixture 21 composed of polymer and melt assistant is charged to feed hopper 11 of the extruder while cooling water is circulated through passageway 14 of section B to maintain the temperature of the mixture well below the boiling point of the melt assistant and, in practice, it is preferred to cool the material in section B at least as low as room temperature. The first section A of the extrusion screw serves to convey the powder and to initiate compaction of the mixture while also advancing the mixture to the second section B in which appreciable compaction of the mass occurs. The amount of compaction that takes place in section B determines the physical composition of the powder plug of the invention. The extent of compaction will depend upon several variables including the particle size and shape of the polymer, the angle of the screw pitch, and the throughput rate of the mixture. The extent of compaction further determines the density and porosity of the powder plug. The porosity of the powder plug is a critical factor in obtaining the advantages of the invention since it is within the capillary passageways of the cold porous plug that liquid melt assistant accumulates to form a pressure barrier.

The plug is shown pictorially as E in the drawing. A typical profile of melt assistant content in the plug is shown graphically in F wherein the melt assistant is water.

After the plug is formed as described, it advances to section C where the plug is disintegrated into particulate chunks by the action of screw 15 against the face of the advancing plug. As the thus-disintegrated mixture passes into the last section D of the extrusion barrel, successively higher temperatures are attained in the mixture by the means used to heat section D. In the last section of the extrusion barrel, D, the mixture reaches a temperature above the atmospheric boiling point of the melt assistant and above the fusion and melting point of the polymer-melt assistant mixture. The pitch of the extruder screws in section D are finer in order to compress the melt into a melt plug and to provide some mixing. At this stage of extrusion, the internal pressure of the extruder exceeds the vapor pressure of the melt assistant. Vaporized gas and liquid melt assistant are in equilibrium at a temperature well above the atmospheric boiling point of the melt assistant. Ordinarily, the vapor under this pressure would be vented backward to the lower pressure zone at the inlet section of the extruder and escape, thus causing blowing. However, the temperature, construction, and forward movement of the porous powder plug in accordance with the present invention are such that escape of vaporized melt assistant, normally sufficient to cause blowing, is prevented. The hot vapor is directed backward toward the inlet section of the extruder and is contacted with the forward surface of the advancing plug. The vapor is condensed upon contact with the cooled plug and absorbed in the capillaries of the plug thus causing the plug to be saturated with condensed vapor for an intermediate distance. Under steady-state conditions, the distance of saturation must be sufficient to provide a pressure seal and yet not extend the entire length of the plug since otherwise vapor would be exposed to escape and blowing through the inlet section. The invention, therefore, provides that conditions of dynamic equilibrium exist whereby the linear backward diffusion of vapor condensed in the porous plug is equal to the linear forward speed of the porous plug under steady-state operational conditions of the entire extruder. There may, however, be brief periods of non-steady-state operational conditions when such dynamic equilibrium may exist, but such brief periods are not stable when considered in terms of stable-state operation where the dynamic equilibrium conditions are maintained for extended periods of time and are discontinued by design.

The porous powder plug of the present invention is generally characterized as having an internal void structure of approximately 50% of its total volume. Thus, when properly fashioned, the plug should generally be capable of absorbing about its own weight of melt assistant. These amounts are not intended to be critical but are suggested as a guide based on experience gained in the development of the present invention. In actual operation, the void formation or porosity of the powder plug is determined by previously noted factors such as size and shape of the polymer particles and degree of compaction.

In the case of acrylonitrile polymers, experience has shown that such polymers made by suspension polymerization having spherical particles of about $10\mu$ to about $100\mu$ are ideally suitable. Such methods of polymerization are well known in the art and are widely used commercially. The degree of compaction will depend largely upon extruder mechanics. The pitch angle of the extruder is significant in such mechanics. Other factors such as polymer feed rate as well as barrel length and diameter will also affect the degree of compaction. All of these criteria are interdependent and require proper balancing to obtain the desired results. These interrelated criteria, therefore, cannot be described individually in any meaningful manner except in terms of the plug characteristics. As described above, the plug is a porous mass. On a volume basis, the plug is typically about 50% voids, but may vary between about 30 to 70% voids. The voids arise as spaces between adjacent polymer particles which form the mass. The voids may be interconnecting or isolated but are sufficiently large, numerous, and available to permit free flow of melt assistant by capillary or other physical means.

The rate of flow of melt assistant through the porous plug is influenced by the porosity or density of the plug, the pressure differential across the plug, and the viscosity of the melt assistant. These latter two variables are not controlled variables. In operation, therefore, the rate of backward diffusion of melt assistant through the plug is counterbalanced by the feed rate or linear advancing speed of the powder plug.

In the case of extruding polymers of acrylonitrile with water as the melt assistant, the following specific details may be used to provide the porous plug and accomplish extrusion of the polymer melt into useful shapes such as fibers.

An acrylonitrile copolymer is first prepared in accordance with the continuous suspension polymerization method described in U.S. Pat. No. 2,847,405 issued to Mallison, Aug. 12, 1958. The wet polymer crumb is uniformly dried to a low moisture level and then blended with sufficient water to give a uniform mixture of polymer and water in which the water content amounts to 16 wt. % of the total weight of polymer and water. The mixture, which is in the nature of damp solid particulates, is charged into the extruder and advanced to the plug-forming zone where it is cooled to less than 100° C. The extruder barrel has an inside diameter of 28 millimeters and the screw pitch in the plug-forming zone is 15 mm. and operates at 150 rpm. A plug having a total length of 60 mm is formed. Continuous forward movement of the plug urges it into the disintegrating zone where the plug is broken up into small fragments prior to entering the melting zone where the mixture is heated to about 100° C. The mixture first softens to a plastic mass and is churned at elevated temperature by the action of the screws with the result that the mixture flows into a homogeneous, continuous, coherent mass while a portion of the water is converted into steam. The plastic mass is further heated to 150° C., and even 180° C., to accomplish uniform melting of the mixture. At these temperatures, steam pressures of over 75 psi, and often over 100 psi, are generated within the extruder barrel associated with the melt zone.

The steam in contact with the surface of the cooled porous plug condenses and saturates the forward-moving plug for a distance backwardly from the extremely hot material under pressure through the cooled polymer mixture under compaction. The cooled porous plug in cooperation with the condensed water vapor contained therein serves to provide the pressure barrier necessary to contain the steam under pressure in the melt zone so as to prevent escape from the extruder and loss through evaporation of water in accordance with the process of the present invention.

In the screw configuration as described above and in the examples which follow, there is repeated reference to screw pitch angle and screw distance or length. An extruder screw is the total complement of a collection of individual screw elements. Each element comprises several screw flights and has an overall length usually measured in millimeters (mm.). A screw flight is the volume defined by adjacent screw threads completing one complete turn on the screw shaft. Although the angle of screw pitch can be determined, the more conventional unit given is in mm. A pitch in mm. is the distance measured along the screw axis required to complete one revolution of screw thread. Thus, for example, a screw section of 60 mm. having a screw thread of 15 mm. will describe 60 mm. of screw length along its axis wherein each screw thread makes one revolution every 15 mm. In 60 mm, there will be four complete revolutions and 3 flights. These concepts are well known to those skilled in the art.

The invention is further illustrated by the examples which follow wherein all percentages are by weight unless otherwise specified.

EXAMPLE 1

A sufficient quantity of bone dry acrylonitrile polymer for continuous operation was blended with a sufficient quantity of water to provide an extrusion mixture containing 16.5% water. The polymer had a composition of 90% acrylonitrile and 10% methyl methacrylate. Blending was carried out using a Patterson Kelly laboratory twin shell blender. An intensifier bar was provided through which the water was sprayed over the rotating polymer for uniform mixing. The mixture was transferred to conical feeding apparatus in association with a Werner and Pfleiderer twin screw co-rotating extruder model ZDS-K-28 having a total screw length of 771 mm. and a barrel diameter of 28 mm. The screw configuration was preset in the following manner. The first 15 mm. of screw from the inlet end had a pitch of 15 mm. This first zone serves only to catch the feed mixture and convey it to the second zone which had 30 mm. pitch for 250 mm. of screw. In a third zone, the screw pitch decreased to 24 mm. for a distance of 48 mm. and in a fourth zone to 15 mm. for a distance of 60 mm, the third and fourth zones serving as the compacting portion of the screw. Immediately thereafter, in a fifth zone, the screw pitch increased to 45 mm. for a distance of 105 mm. and this zone served to disintegrate or break up the compacted plug. In a sixth zone, the screw pitch was again increased to 24 mm. for a distance of 232 mm. and in a seventh zone to a pitch of 15 mm. for a distance of 60 mm. The sixth and seventh served to melt and densify the polymer mass. A spacer of 1 mm. length was employed between the sixth and seventh zone in order to complete the entire screw length of 771 mm.

The polymer mixture was fed into the extruder at a feed rate of 40 grams per minute while rotating the screw at 150 rpm after the extruder was filled with polymer mixture. The temperature of the polymer mixture along the entire length of the extruder barrel was adjusted by cooling or heating with suitable means as previously described. Temperature recording instruments indicated that the temperature within the conveying portion started at 49° C. and increased to 66° C. before being compacted at 82° C. During melting, the temperature was maintained at 160° C. until the melt left the extruder. Internal pressure of about 90 psig was obtained.

The extruder was operated for more than 6 hours without incident before it was shut down. The screws were withdrawn from the extruder. Moisture determinations of the polymer mix along the screw indicated that in the fourth zone, a sharp increase in water content from 16.5% to about 50% had occurred. No pressure drops, blowbacks, feed interruptions, or torque overload were noted throughout the entire run. Such operation, therefore, represents a typical operation of the process of the present invention.

COMPARATIVE EXAMPLE A

Example 1 was repeated in every material detail except that heating was applied to the compacting zone, the fourth zone of the screw, so that the temperature of the polymer mix was 160° C. After only 30 minutes of operation, there were feed interruptions accompanied by excessive torque on the rotating screw. The screw then froze in place and caused shutdown of the extruder.

EXAMPLE 2

The procedure of Example 1 was again repeated in every material detail except that the temperature of zone four of the screw was heated to 100° C. Operation appeared to be acceptable. The temperature of zone four was slowly allowed to reach 130° C., whereupon a pressure drop was recorded and extruder operation became marginal. The temperature of the zone was then returned to slightly below 100° C. whereupon pressure drops were no longer recorded and operation returned to normal.

This example illustrates the criticality of temperature in the compacting zone where the porous plug is provided. The temperature in this zone must be held below the atmospheric boiling point of the melt assistant which in the case of water is 100° C.

COMPARATIVE EXAMPLE B

As in Example 1, an extruder run was made having approximately the same temperature profile, that is, the temperature prior to and around the porous plug was less 88° C. except that the configuration of the screw was preset in a different manner.

In this run, a first screw zone of 15 mm. pitch for 15 mm. distance was used, followed by a second zone of 45 mm. pitch for 15 mm. distance. The third and fourth zone were, respectively, of 30 mm. pitch for 160 mm. distance and of 24 mm. pitch for 144 mm. distance. For further compacting purposes, a fifth zone of 30 mm. reverse pitch for a distance of 30 mm. was used. This zone tended to feed polymer mixture back toward the feed inlet causing a very dense plug to form. The plug advanced to a sixth zone of 45° pitch for 30 mm. distance where it was broken up, or disintegrated. There followed a seventh and an eighth zone of, respectively, 30 mm. pitch for 232 mm. and 24 mm. pitch for 145 mm.

Polymer mix was fed into the extruder at a screw rotation of only 50 rpm. Steady operation of the extruder could not be achieved due to constant overtorqueing of the screw. This condition was attributed to the fact that the degree of compaction of the polymer mix in the plug-forming zone was too great. In no case was the use of left-hand or reverse pitch screw elements in the plug-forming zone found to be acceptable.

From additional experimental data, it is evident that a preset screw configuration containing an equal or increasing pitch angle through the compacting zone would result in too little compaction of the polymer mix to provide an acceptable porous plug. For proper operation, it is necessary to have a constantly decreasing pitch angle through the compacting zone to form the desired porous plug without resort to reverse pitch.

We claim:

1. In a continuous melt extrusion process comprising feeding a refractory polymer and a melt assistant into a feeding zone of a screw extruder, compressing said polymer and melt assistant in a compressing zone of said extruder, heating said polymer and melt assistant in a melting zone to form a single phase fusion melt of the polymer and melt assistant at a temperature above the atmospheric boiling point of said melt assistant prior to exiting from a shape-forming outlet of said extruder, and extruding said single phase fusion melt through said outlet, the improvement which comprises establishing at a zone intermediate between said compressing and said melting zones within said extruder a porous plug of compacted polymer and melt assistant at a temperature below the atmospheric boiling point of said melt assistant, said porous plug having from about 30 to 70% voids on a volume basis and containing melt assistant condensed within the pores of said plug, and advancing said plug toward the outlet of said extruder at a linear rate equal to the rate at which the melt assistant condensed within the pores of said plug moves toward said feeding zone as a result of pressure generated within said pressure zone and capillary forces within said porous plug so that escape of vaporized melt assistant is prevented.

2. The process of claim 1 wherein said continuous operation is at steady-state conditions.

3. The process of claim 1 wherein the refractory polymer is an acrylonitrile polymer.

4. The process of claim 3 wherein the melt assistant is water.

* * * * *